UNITED STATES PATENT OFFICE.

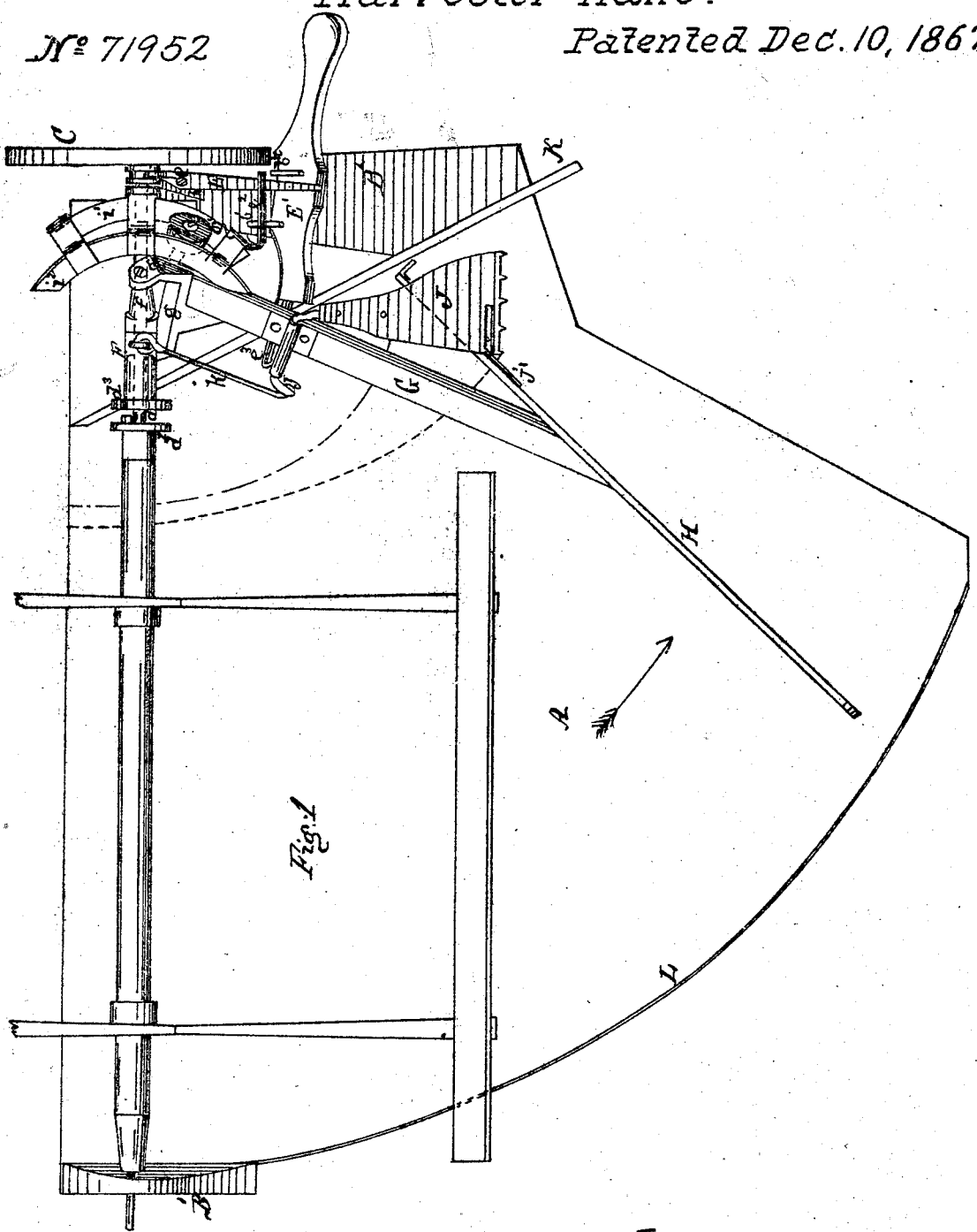

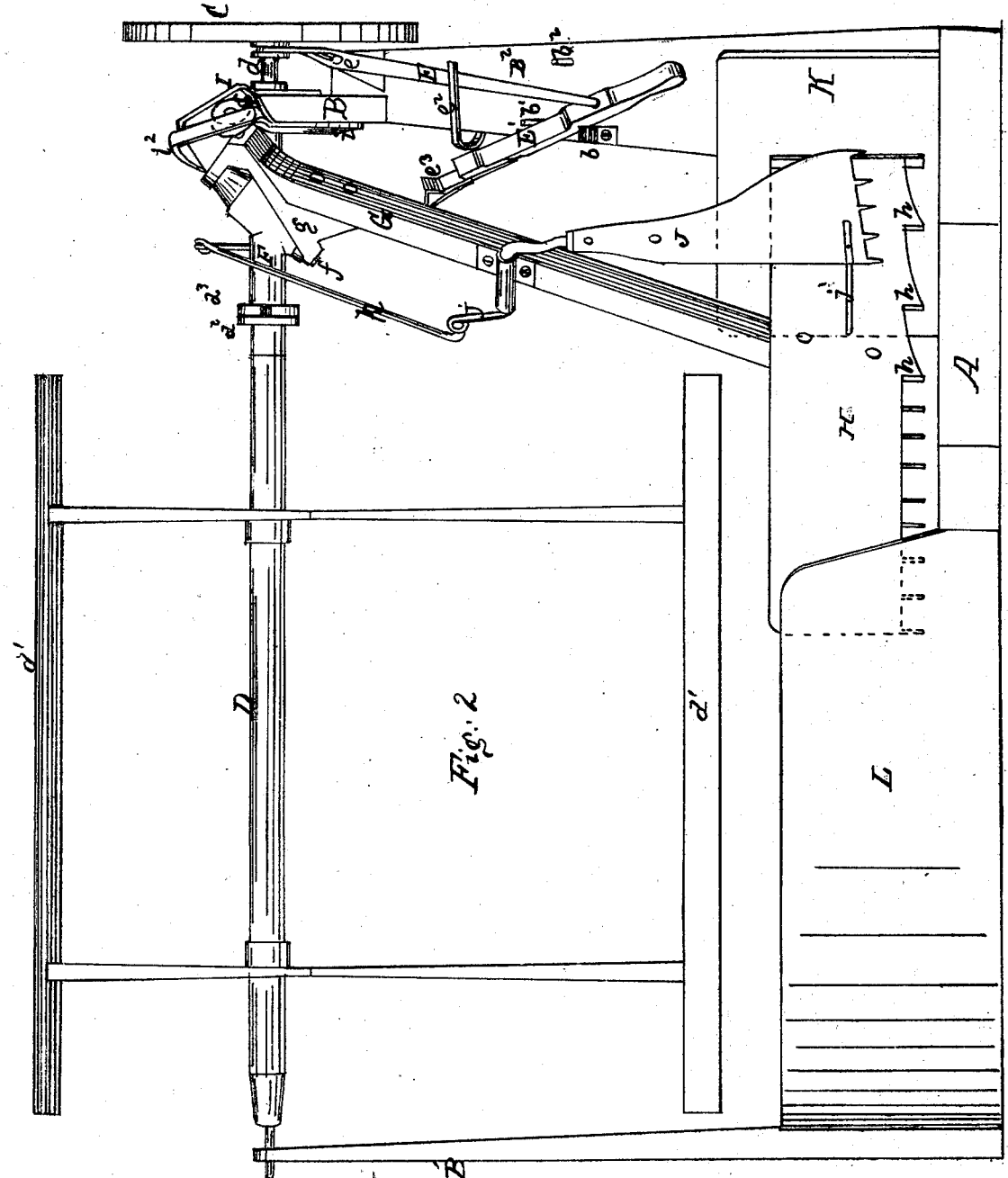

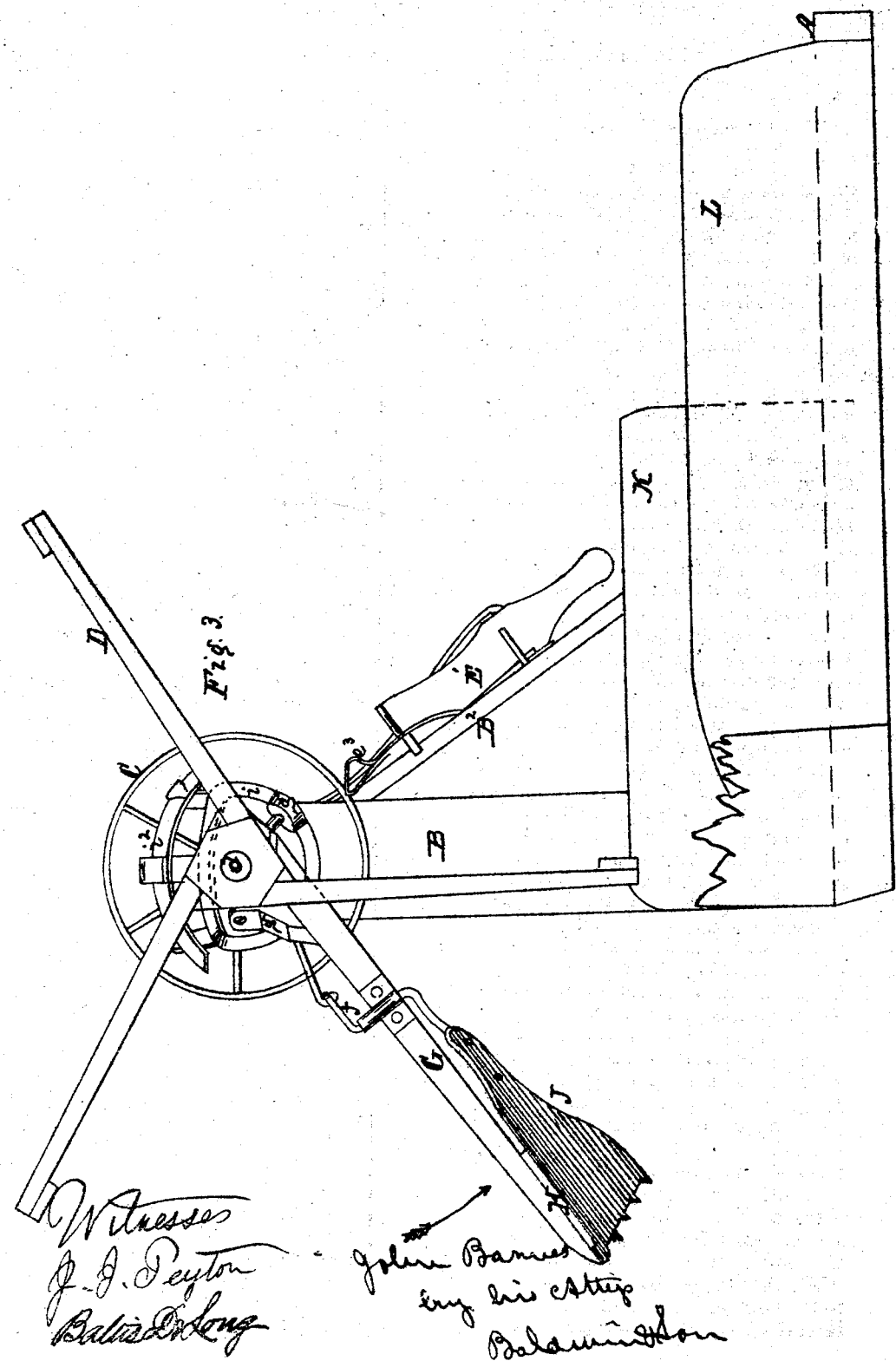

JOHN BARNES, OF ROCKFORD, ILLINOIS.

IMPROVEMENT IN HARVESTER-RAKES.

Specification forming part of Letters Patent No. 71,952, dated December 10, 1867.

*To all whom it may concern:*

Be it known that I, JOHN BARNES, of Rockford, in the county of Winnebago and State of Illinois, have invented a new and useful Improvement in Harvester-Rakes, of which the following is a full, clear, and exact description, reference being had to the accompanying drawings, which make part of this specification, and in which—

Figure 1 represents a plan or top view of so much of a harvester to which my improvement is applied as is necessary to illustrate my invention. Fig. 2 represents a view, in elevation, of the same, as seen from the rear; and Fig. 3 represents a similar view of the same, as seen from the divider side of the machine, with the reel-post on that side removed.

My invention relates to that class of harvester-rakes in which both a rake and a reel are mounted on the same horizontal axis.

In the accompanying drawings, a reel, D, having three vanes or beaters, $d^1$, is shown as mounted in suitable standards B $B^1$, rising from a platform, A. A rake-head, H, is secured to a straight inclined arm, G, pivoted at its upper end to trunnions $f$, projecting diagonally from a sleeve, F, fitting loosely on the reel-shaft $d$. The rake-head has ratchet-teeth $h$ on its inner edge, for the purpose of pushing the grain toward the divider side of the machine. This device works well in long grain; but to increase its efficiency in short grain, I employ an additional rake or compressor, J, attached to a crank-arm, $j$, pivoted on the rake-handle, and connected, by a link-rod, $k$, with the collar F. The compressor is set at an obtuse angle to the rake-head, but moves parallel with its face.

To prevent the friction of the compressor on the rake-head, I interpose a slight spring, $j'$, between them, the spring being secured by one end to the compressor, while the other slides freely on the rake-head.

The rake is pivoted on the trunnions by a bifurcated lug, $g$, on the outer end of which a friction-roller, $g'$, is mounted. This roller traverses on a camway, I, of a peculiar shape, which controls the movements of the rake. The lower part, $i$, of this guide is vertical, while the upper part, $i^1$, is not only flattened until it is nearly horizontal, but is projected out laterally beyond the vertical plane of the lower portion of the guide. This portion of the guide is also provided with a guard-rail, $i^2$, to keep the roller $g^1$ in position while traversing it.

This mode of construction enables me to attain the requisite movement of the rake by the use of a single cam, while dispensing with the cumbrous connecting-rods and levers heretofore employed for producing this result.

The rake and reel are driven by power applied in any suitable manner to the projecting end of the reel-shaft $d$.

In this instance I have shown a band-wheel or pulley, C, mounted on the shaft, and having a grooved collar on its inner side, in which the forked end of a shipping-lever, E, works. This lever moves on a fulcrum, $e$, on the brace $B^2$, and its lower end is pivoted to a swinging lever or catch, E'. A spring, $e^2$, keeps the shipping-lever down to its work. The catch E' vibrates on its point of connection with the shipping-lever as a pivot, moving parallel with the inclined brace $B^2$, on which it rests, and being limited in its movement by suitable stops $b\ b^1\ b^2$ on the brace. The outer end of this lever is furnished with a hook, $e^3$, in which the rake-handle G is caught, as the gavel is discharged, when it is desired to stop the rake, as hereinafter explained. The reel-shaft $d$ is moved endwise in its bearings by the shipping-lever E, to throw the rake into or out of gear. Pins on a flange, $d^2$, on the reel-shaft take into notches in a corresponding flange, $d^3$, on the rake-sleeve F, and thus lock the two together. In Fig. 1 the parts are shown in the position they occupy when the rake is out of gear, and in Figs. 2 and 3 the rake is shown in gear. The collar F turns in bearings in the standard B, and has no end play; consequently the rake and its guides always maintain the same relation to each other and the supporting-standard, whether the rake be in or out of gear, the reel alone changing its position by sliding endwise in its bearings.

I have described those parts only of the machine relating to my invention; but in practice they would, of course, be used on a fully organized machine.

The operation of the machine is as follows: The reel-shaft is rotated in the direction of the arrows, and sweeps the standing grain back against the cutters, which sever it; the reel then sweeps it back upon the platform.

The rake can be thrown into gear, so as to rotate between any two of the reel-vanes. As it descends into the grain, the parts assume the position shown in Fig. 3, in which the friction-roller runs on the lower vertical part of the cam, and the compressor rests against the flange on the rake-head. When the rake has swept over about one-third of the depth of the platform, the roller enters the horizontal part of the cam, the compressor moves outward, shoving the gavel before it, and compressing it, while the rake, which has heretofore moved over the platform in a slightly-curved line, is suddenly deflected and drawn in horizontally, and with a sharp curve, against the inner guard K of the platform, which guard, it will be seen, is straight, while the outer fence L is curved to suit the movement of the rake. As the compressor moves out as the rake moves in toward its pivot, the resultant curve described by the compressor is more gentle than that described by the rake. This will be seen by reference to Fig. 1, where one line shows the path of the inner end of the rake, while another line shows that of the compressor. As the rake retrogrades, its teeth or ratchets crowd the gavel over toward the divider end of the platform, and thus render it more compact. As soon as the gavel is discharged the rake rises, the friction-roller still traveling on the horizontal part of the guide, until the rake has passed beyond the vertical plane of the reel-shaft, the compressor being at the same time retracted by its link-rod, and by the movement of the rake on its diagonal pivots, at which moment the roller reaches the vertical part of the cam, and the rake drops quickly into the grain in advance of the cutters.

The lateral deflection of the horizontal part of the guide, and the diagonal arrangement of the pivots of the rake, enable me very much to simplify the construction of the machine.

To throw the rake out of gear at the end of its stroke, the lever E' is thrown into the position shown in Fig. 1. As the rake discharges the gavel, it slips over the hook $e^3$ of the lever, and when it begins to rise its weight causes the lever to move endwise, carrying the shipping-lever E with it, and thus moving the reel-shaft endwise, and uncoupling the rake and reel; the rake is thus stopped, while the reel still rotates. The rake pursues a path which intersects that of the reel, both while raking off and while moving forward. It is so arranged, however, as to work equally well between any two of the ribs without having to wait until a particular part of the reel comes round, and can only be thrown out of gear automatically at the end of its stroke—that is, at the moment of discharge, when it is out of the way of the reel, and, of course, always starts from this same position. Owing to the diagonal arrangement of the trunnions, the rake is behind its axis of rotation when raking off, and in front of it when moving forward, by which arrangement the weight of the rake aids its movement, and thus enables it to be driven with less power than would be required were the rake on the other side of the shaft. This capability saves time, and also enables me to gage the size of the gavels more accurately than could be done by the other arrangement.

What I claim as my invention, and desire to secure by Letters Patent, is—

1. The inclined serrations $h\ h\ h$ on the face of the rake-head, for the purpose of compacting the gavel.

2. A compressor or supplementary rake pivoted to the rake-handle, and moving parallel to the rake-head, substantially as described.

3. The combination, substantially as described, of an automatic rake, a compressor, and an interposed spring, for the purpose set forth.

4. The combination, substantially as described, of a reel revolving continuously on a horizontal shaft, a rake mounted on the same shaft, (on trunnions arranged diagonally to the shaft,) and a shipping device, by which the rake may be thrown into gear between any two of the beaters of the reel, and by which it may automatically be thrown out of gear at the end of its stroke.

5. The combination, substantially as described, of the inclined rake-handle with the trunnions or pivots revolving on the reel-shaft, and arranged diagonally thereto.

6. The combination, substantially as described, of the rake-handle, pivoted on trunnions diagonal to the reel-shaft, and the friction-roller, with a guide vertical below the axis of the rake, and deflected both horizontally and laterally above that axis, as and for the purpose set forth.

7. The combination, substantially as described, of the rake-handle and shipping-lever, whereby the rake throws itself out of gear after discharging the gavel.

8. The combination, substantially as described, of a rake mounted on trunnions, revolving on a horizontal axis in a fixed relation to the guide which controls the movements of the rake, with a revolving reel having an endwise movement on the same axis, whereby the rake can be thrown out of gear by moving the reel endwise, without stopping the reel.

In testimony whereof I have hereunto subscribed my name.

JOHN BARNES.

Witnesses:
J. G. MANLOVE,
GEORGE HART.